(12) United States Patent
Ohno et al.

(10) Patent No.: US 11,926,336 B2
(45) Date of Patent: Mar. 12, 2024

(54) VEHICLE CONTROL DEVICE

(71) Applicant: HONDA MOTOR CO., LTD., Tokyo (JP)

(72) Inventors: Satoshi Ohno, Tokyo (JP); Takafumi Kato, Tokyo (JP); Tomoya Toyohira, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 176 days.

(21) Appl. No.: 17/669,521

(22) Filed: Feb. 11, 2022

(65) Prior Publication Data
US 2022/0306138 A1 Sep. 29, 2022

(30) Foreign Application Priority Data
Mar. 25, 2021 (JP) .............................. 2021-051515

(51) Int. Cl.
*B60W 50/12* (2012.01)
*B60W 30/18* (2012.01)
*B60W 40/105* (2012.01)

(52) U.S. Cl.
CPC ...... *B60W 50/12* (2013.01); *B60W 30/18109* (2013.01); *B60W 40/105* (2013.01); *B60W 2520/28* (2013.01)

(58) Field of Classification Search
CPC .......... B60W 50/12; B60W 30/18109; B60W 40/105; B60W 2520/28; B60W 30/146; B60W 50/029; B60W 2720/10; Y02T 10/72; B60G 17/015; B60G 17/0185; B60G 17/019; B60G 17/01908; B60G 17/0195

See application file for complete search history.

(56) References Cited

U.S. PATENT DOCUMENTS

| | | | |
|---|---|---|---|
| 9,732,823 B2 * | 8/2017 | Kato | B60G 17/06 |
| 2013/0253756 A1 * | 9/2013 | Matsuno | B60W 50/082 |
| | | | 701/29.2 |

FOREIGN PATENT DOCUMENTS

| | | |
|---|---|---|
| JP | 2007-37264 A | 2/2007 |
| JP | 2013-193612 A | 9/2013 |
| JP | 2016-13794 | 1/2016 |

OTHER PUBLICATIONS

Japanese Office Action dated Jan. 17, 2023 issued in corresponding Japanese application No. 2021-051515; English machine translation included (7 pages).

* cited by examiner

*Primary Examiner* — Xiao En Mo
(74) *Attorney, Agent, or Firm* — Rankin, Hill & Clark LLP

(57) ABSTRACT

An electric suspension control, in a vehicle including an electric suspension apparatus driven with a motor, short-circuits the motor and limits a vehicle speed to a predetermined speed or less, in a case where an abnormality occurs in the electric suspension apparatus.

4 Claims, 5 Drawing Sheets

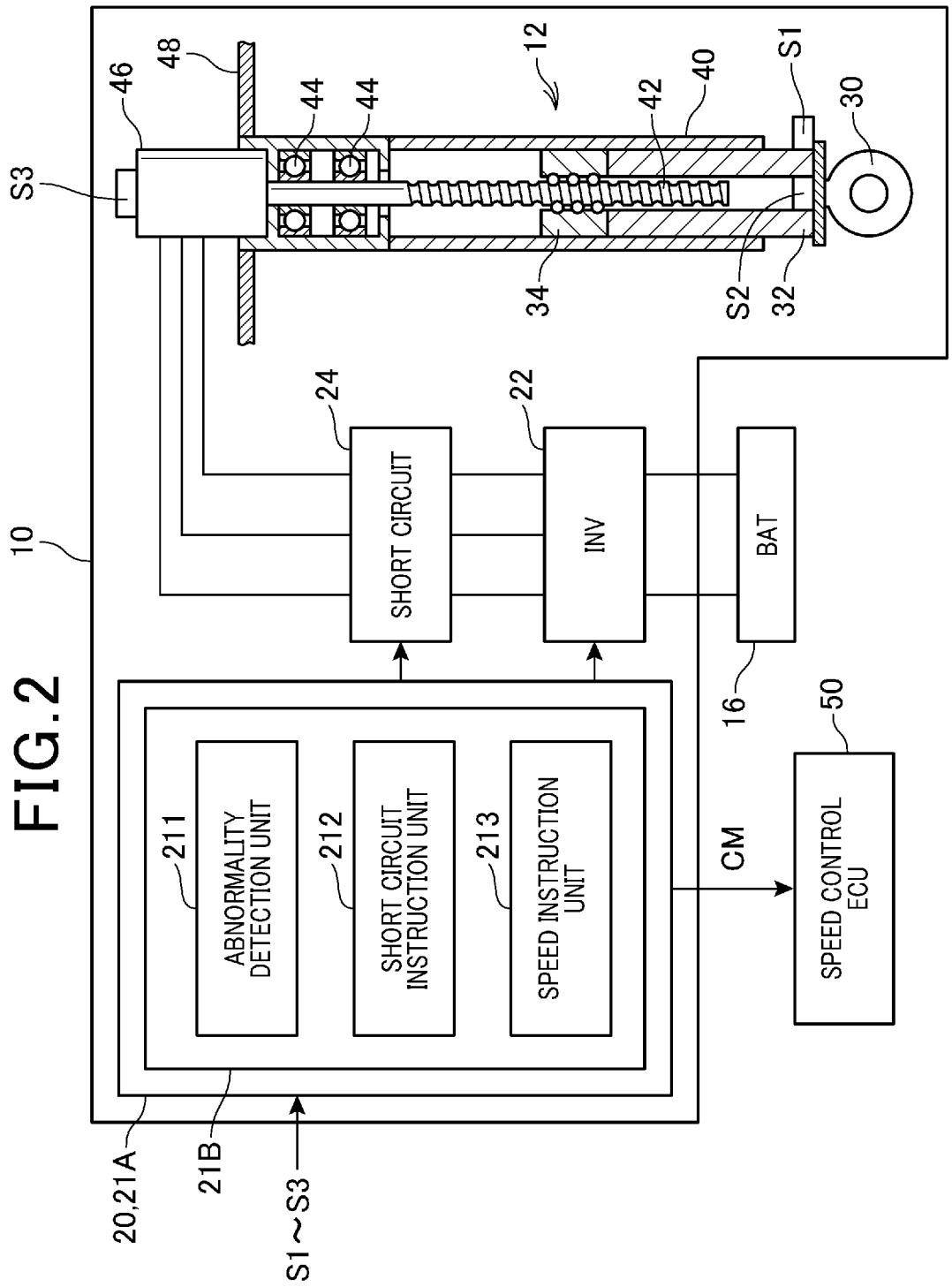

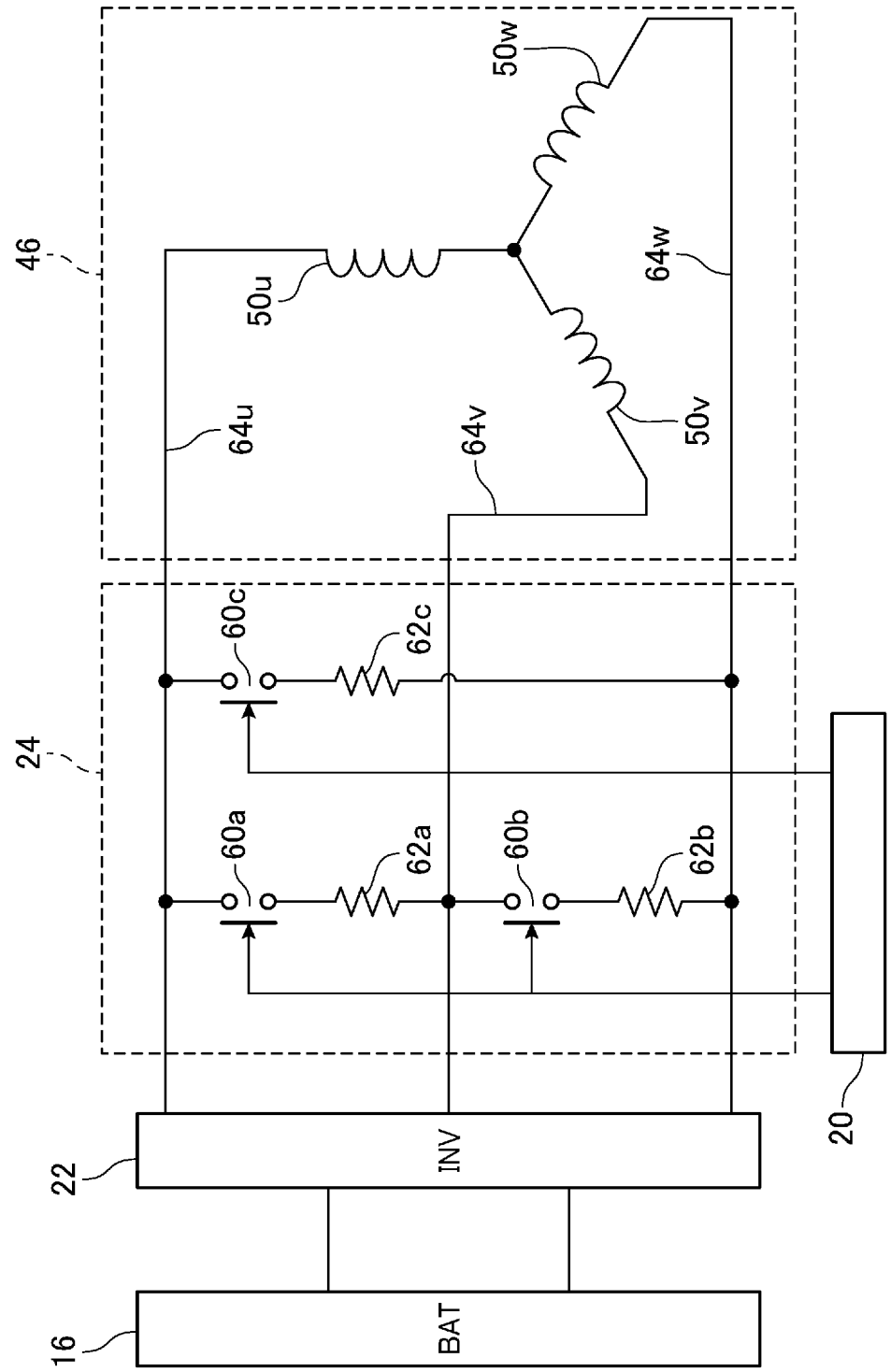

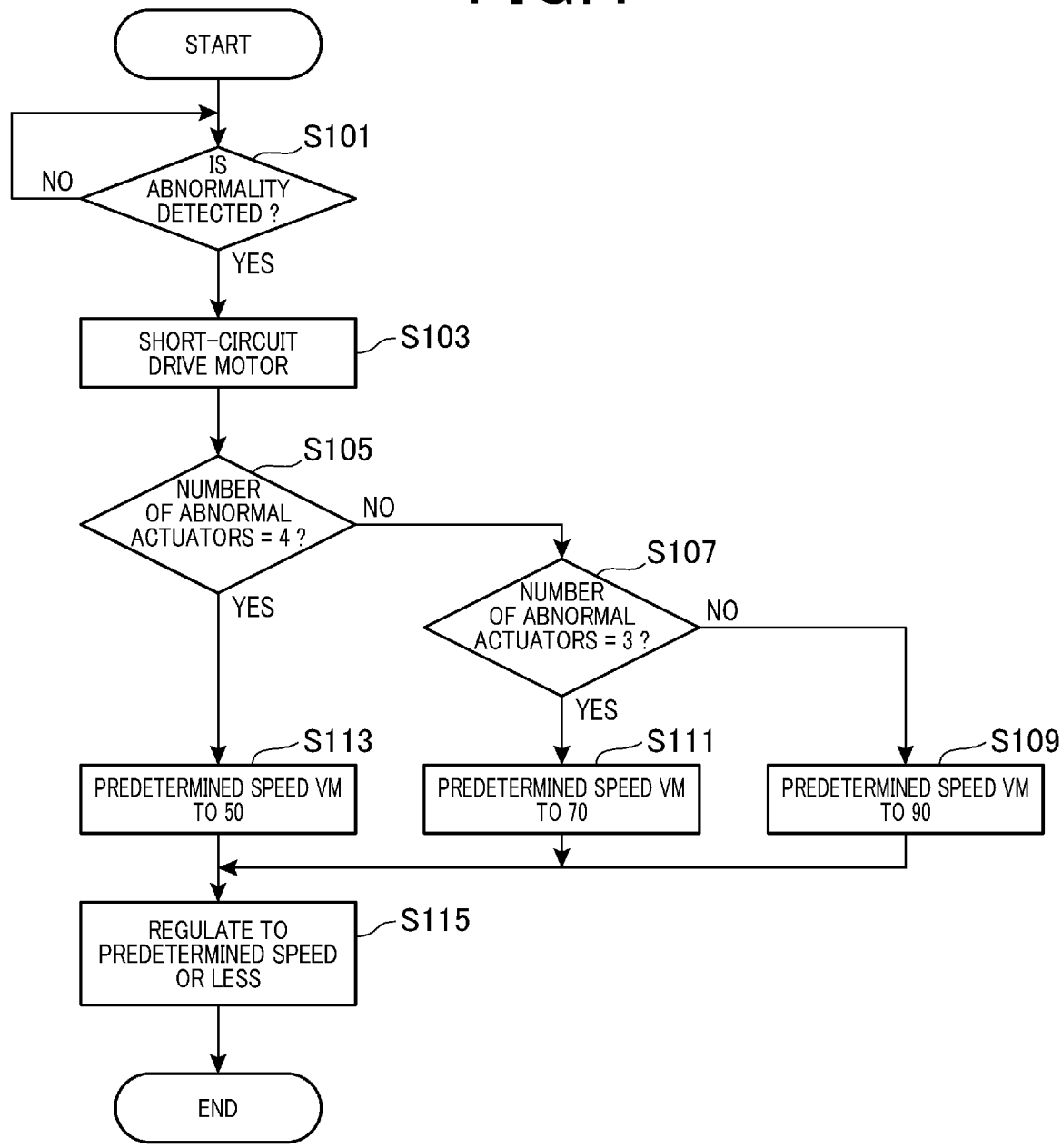

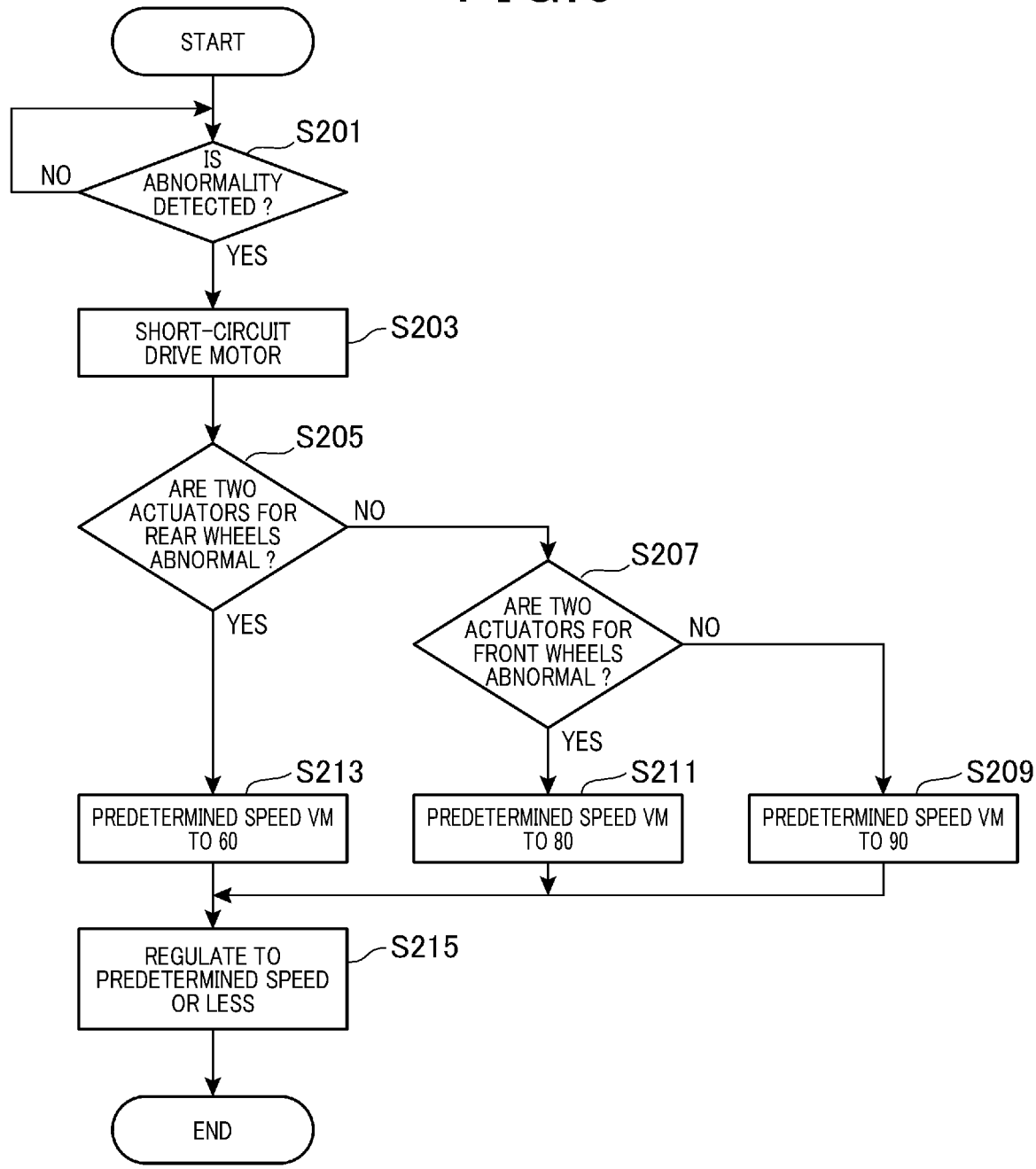

VEHICLE CONTROL DEVICE

INCORPORATION BY REFERENCE

The present application claims priority under 35 U.S.C. § 119 to Japanese Patent Application No. 2021-051515 filed on Mar. 25, 2021. The content of the application is incorporated herein by reference in its entirety.

BACKGROUND OF THE INVENTION

Field of the Invention

The present invention relates to a vehicle control device.

Description of the Related Art

Heretofore, a technology concerning an electric suspension apparatus mounted in a vehicle and driven with a motor has been known.

For example, in an electric suspension apparatus described in Japanese Patent Laid-Open No. 2016-13794, when a vehicle speed is equal to or less than a predetermined vehicle speed, for example, at the time of starting or decelerating, a motor is short-circuited to generate a damping force.

However, in an electric suspension apparatus described in Japanese Patent Laid-Open No. 2016-13794, damping force characteristics in a case of short-circuiting a coil are different from damping force characteristics of a general hydraulic damper in that a damping force decreases in a region where a suspension stroke speed is high, and the apparatus has a problem of making a driver feel uncomfortable with tire vibration damping properties.

The present invention is intended to provide a vehicle control device effectively using a damping force obtained by short-circuiting a motor in an electric suspension apparatus.

SUMMARY OF THE INVENTION

An aspect of the present invention is a vehicle control device which, in a vehicle including an electric suspension apparatus driven with a motor, short-circuits the motor and limits a vehicle speed to a predetermined speed or less, in a case where an abnormality occurs in the electric suspension apparatus.

According to another aspect of the present invention, the electric suspension apparatus includes an electric actuator provided for each of a plurality of wheels, and the vehicle control device lowers the predetermined speed, as the number of electric actuators which become abnormal increases.

According to still another aspect of the present invention, the electric suspension apparatus includes an electric actuator provided for each of a plurality of wheels, and the vehicle control device lowers the predetermined speed, in a case where the electric actuator provided for a rear wheel becomes abnormal, as compared with a case where the electric actuator provided for a front wheel becomes abnormal.

According to a further aspect of the present invention, the predetermined speed is equal to or more than 1 km/hour.

According to an aspect of the present invention, a damping force obtained by short-circuiting a motor in an electric suspension apparatus can be effectively used.

BRIEF DESCRIPTION OF THE DRAWINGS

FIG. 2 is a diagram showing an example of a configuration of the electric suspension apparatus;

FIG. 3 is a diagram showing an example of a configuration of a short circuit;

FIG. 4 is a flowchart showing an example of processing of a control ECU according to a first method; and FIG. 5 is a flowchart showing an example of processing of a control EU according to a second method.

DETAILED DESCRIPTION OF THE PREFERRED EMBODIMENT

Figure 1:
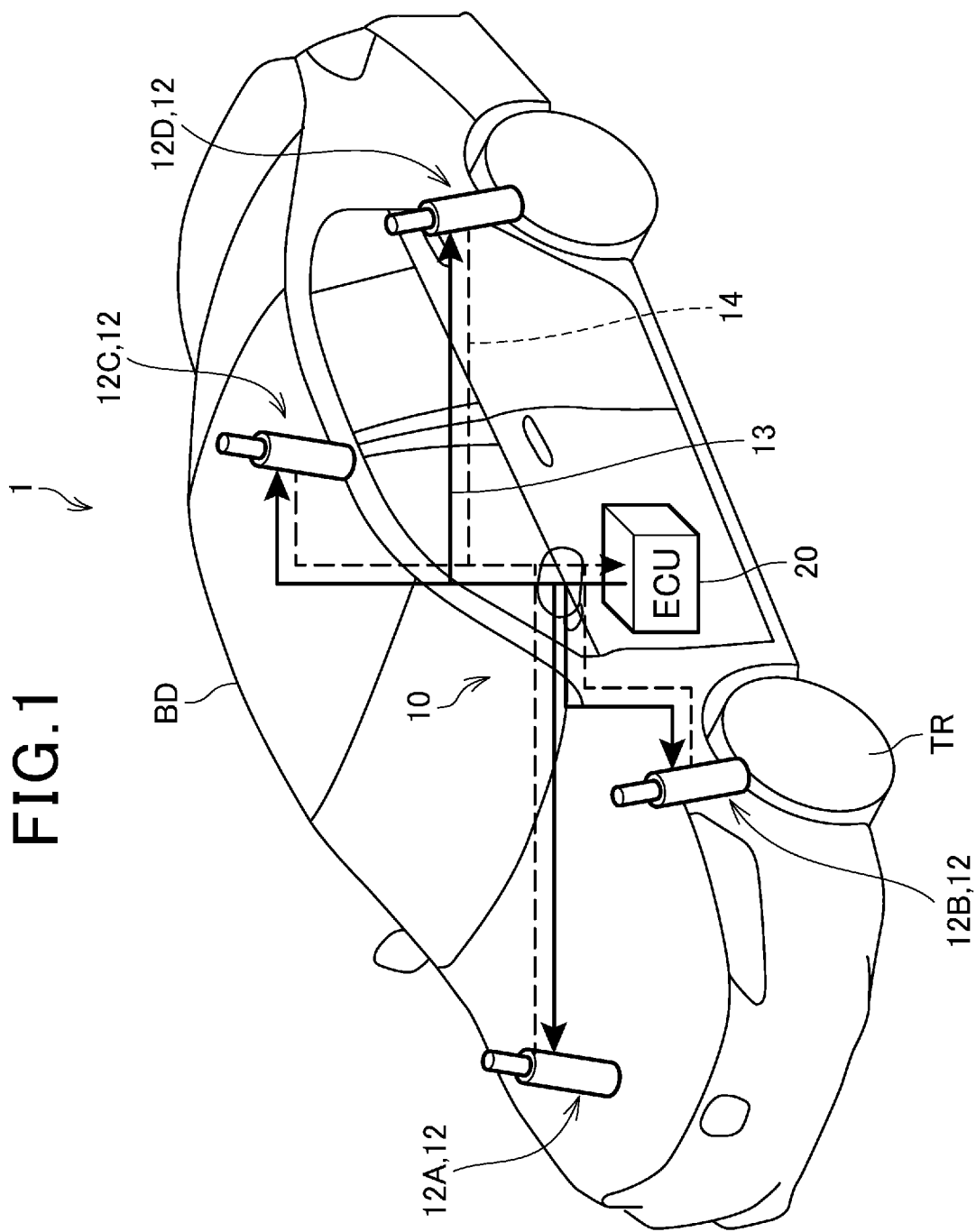
FIG. 1 is a perspective view showing an example of arrangement of an electric suspension apparatus.

Hereinafter, an embodiment of the present invention will be described with reference to the drawings.

1. Configuration of Electric Suspension Apparatus

FIG. 1 is a perspective view showing an example of arrangement of an electric suspension apparatus 10. FIG. 2 is a diagram showing an example of a configuration of the electric suspension apparatus 10.

Description will be made as to the electric suspension apparatus 10 with reference to FIGS. 1 and 2.

As shown in FIG. 1, a vehicle 1 includes a vehicle body BD, four wheels TRs, and the electric suspension apparatus 10. The electric suspension apparatus 10 includes an electric actuator 12, and an electric suspension control ECU 20.

The electric actuator 12 includes a first electric actuator 12A, a second electric actuator 12B, a third electric actuator 12C, and a fourth electric actuator 12D. The first electric actuator 12A is disposed between the vehicle body BD and a right front wheel. The second electric actuator 12B is disposed between the vehicle body BD and a left front wheel. The third electric actuator 12C is disposed between the vehicle body BD and a right rear wheel. The fourth electric actuator 12D is disposed between the vehicle body BD and a left rear wheel.

The electric suspension control electronic control unit (ECU) 20 controls each of the first electric actuator 12A to the fourth electric actuator 12D. The electric suspension control ECU 20 is connected to each of the first electric actuator 12A to the fourth electric actuator 12D via a power line 13 and a signal line 14.

The power line 13 supplies power from a battery 16 shown in FIG. 2 to each of the first electric actuator 12A to the fourth electric actuator 12D. The signal line 14 transmits detection signals of a sensor S1 to a sensor S3 shown in FIG. 2 to the electric suspension control ECU 20.

Description will be made as to the sensor S1 to the sensor S3 with reference to FIG. 2.

In the following description, the electric suspension control ECU 20 may be described as the control ECU 20 for convenience.

The first electric actuator 12A to the fourth electric actuator 12D include about the same configuration, and hence in a case where each of the first electric actuator 12A to the fourth electric actuator 12D is not distinguished, each of the first electric actuator 12A to the fourth electric actuator 12D may be described below simply as the electric actuator 12.

Next, description will be made as to a configuration of the electric actuator 12 with reference to FIG. 2.

As shown in the right side of FIG. 2, the electric actuator 12 includes a coupling part 30, an inner tube 32 and a nut 34 as members on a wheel TR side. Also, the electric actuator 12 includes an outer tube 40, a screw shaft 42, a bearing 44, and the motor 46 as members on a vehicle body BD side. The outer tube 40, the screw shaft 42, the bearing 44 and the motor 46 are fixed to a chassis 48 disposed in a lower part of the vehicle body BD.

Description will be made as to a configuration of the motor 46 with reference to FIG. 3.

The screw shaft 42 is supported by the bearing 44 and the nut 34. The nut 34 has an inner surface screwed into a screw groove formed in an outer surface of the screw shaft 42 via a bearing.

When the motor 46 rotates the screw shaft 42, the nut 34 is moved in an up-down direction. When moving the nut 34 downward, the inner tube 32 is moved downward. When moving the nut 34 upward, the inner tube 32 is moved upward.

Consequently, a position of the inner tube 32 in the up-down direction to the outer tube 40 fixed to the chassis 48 of the vehicle body BD can be adjusted.

The coupling part 30 is fixed to a knuckle (not shown) of the suspension apparatus, and is accordingly coupled to the wheel TR. When inputting vibration from the wheel TR side into the coupling part 30 and applying, for example, an upward acceleration α to the coupling part 30, the inner tube 32 and the nut 34 are raised integrally with the outer tube 40. In this case, the motor 46 rotates the screw shaft 42 to move the inner tube 32 in a direction to absorb the upward acceleration, i.e., in an upward direction, so that vibration from the wheel TR to the vehicle body BD can be attenuated.

In the electric actuator 12, an acceleration sensor S1, a stroke sensor S2 and a rotation angle sensor S3 are arranged.

The acceleration sensor S1 is fixed to, for example, an outer circumferential surface of the inner tube 32, to detect the acceleration α applied from the wheel TR side to the coupling part 30. Note that the acceleration sensor S1 may be disposed, for example, in or in the vicinity of the chassis 48 of the vehicle body BD or the motor 46.

The stroke sensor S2 is disposed at a position facing the screw shaft 42 of the inner tube 32, to detect a stroke ST indicating a downward moving amount of the nut 34. The stroke sensor S2 is composed of a distance measurement sensor or the like.

The rotation angle sensor S3 is composed of a so-called resolver or the like, to detect a rotation angle θ of the motor 46.

The acceleration α, the stroke ST and the rotation angle θ are outputted to the control ECU 20.

2. Configuration of Electric Suspension Control ECU

The control ECU 20 controls the motor 46 through an inverter 22, based on detection results of the acceleration sensor S1, the stroke sensor S2 and the rotation angle sensor S3.

The control ECU 20 includes a memory 21A and a processor 21B.

The memory 21A is a storage device which stores, in a nonvolatile manner, a program to be executed by the processor 21B and data. The memory 21A is composed of a magnetic storage device, a semiconductor storage element such as a flash read only memory (ROM), or another type of nonvolatile storage device. Also, the memory 21A may include a random-access memory (RAM) included in a work area of the processor 21B. The memory 21A stores data to be processed by the control ECU 20, and a control program to be executed by the processor 21B.

The electric suspension control ECU 20 corresponds to an example of "a vehicle control device".

The processor 21B may be composed of a single processor, or a plurality of processors which function as the processor 21B. The processor 21B executes the control program to control each part of the electric suspension apparatus 10.

The control ECU 20 includes an abnormality detection unit 211, a short circuit instruction unit 212, and a speed instruction unit 213. Specifically, the processor 21B of the control ECU 20 executes the control program, to function as the abnormality detection unit 211, the short circuit instruction unit 212, and the speed instruction unit 213.

The abnormality detection unit 211 determines whether an abnormality occurs in the electric suspension apparatus 10.

The abnormality detection unit 211 determines whether the abnormality occurs in the electric suspension apparatus 10, for example, based on detection results of the acceleration sensor S1, the stroke sensor S2, and the rotation angle sensor S3.

For example, in a case where an S/N ratio of the detection signal of each of the acceleration sensor S1, the stroke sensor S2 and the rotation angle sensor S3 is equal to or less than a predetermined S/N ratio, the abnormality detection unit 211 determines that the abnormality occurs in the electric suspension apparatus 10. Also, in a case where the detection signal of each of the acceleration sensor S1, the stroke sensor S2 and the rotation angle sensor S3 is equal to or more than a predetermined upper limit value or is equal to or less than a predetermined lower limit value, the abnormality detection unit 211 determines that the abnormality occurs in the electric suspension apparatus 10.

Further, for example, in a case where each of the first electric actuator 12A to the fourth electric actuator 12D is not normally operated, the abnormality detection unit 211 determines that the abnormality occurs in the electric suspension apparatus 10.

It is assumed that, as the abnormality of the electric suspension apparatus 10, for example, an abnormality of a drive supply power source to the electric suspension control ECU 20 is detected by a voltage sensor, generation of excessive heat in the electric suspension control ECU 20 is detected by a temperature sensor, or generation of excessive current is detected by a current sensor.

The short circuit instruction unit 212 short-circuits the motor 46 of each of the first electric actuator 12A to the fourth electric actuator 12D, in a case where the abnormality detection unit 211 determines that the abnormality occurs in the electric suspension apparatus 10.

Specifically, in a case where the abnormality detection unit 211 determines that an abnormality occurs in one of the first electric actuator 12A to the fourth electric actuator 12D, the short circuit instruction unit 212 short-circuits the motor 46 of each of the first electric actuator 12A to the fourth electric actuator 12D.

Also, the short circuit instruction unit 212 short-circuits the motor 46 of each of the first electric actuator 12A to the fourth electric actuator 12D through a short circuit 24 to be described with reference to FIG. 3.

The speed instruction unit 213 instructs a speed control ECU 50 to limit a vehicle speed V to a predetermined speed VM or less, in the case where the abnormality detection unit 211 determines that the abnormality occurs in the electric suspension apparatus 10.

For example, the speed instruction unit 213 lowers the predetermined speed VM, as a number NE of electric actuators 12 which become abnormal increases. The number NE is the number of the electric actuators 12 determined to be abnormal by the abnormality detection unit 211, in the first electric actuator 12A to the fourth electric actuator 12D. Description will be made as to this method (hereinafter referred to as "a first method" as the case may be) with reference to FIG. 4.

Also, for example, the speed instruction unit 213 lowers the predetermined speed VM in a case where the electric actuator 12 provided for the rear wheel becomes abnormal, as compared with a case where the electric actuator 12 provided for the front wheel becomes abnormal. Description will be made as to this method (hereinafter referred to as "a second method" as the case may be) with reference to FIG. 5.

Further, the speed instruction unit 213 sets the predetermined speed VM to 1 km/hour or more.

The speed control ECU 50 controls at least one of a drive mechanism, a drive force transmitting mechanism and a braking mechanism, following an instruction from the speed instruction unit 213, in such a manner that the vehicle speed V of the vehicle 1 is equal to or less than the predetermined speed VM.

The drive mechanism includes at least one of an engine and a drive motor. The speed control ECU 50 regulates the vehicle speed V, for example, by decreasing a rotation speed of the engine. Also, the speed control ECU 50 regulates the vehicle speed V, for example, by decreasing a rotation speed of the drive motor.

The drive force transmitting mechanism transmits a drive force of the engine to a drive wheel. The drive force transmitting mechanism includes a plurality of gears having a gear ratio. The speed control ECU 50 regulates the vehicle speed V, for example, by increasing the gear ratio.

The braking mechanism includes a disk brake. The speed control ECU 50 regulates the vehicle speed V by pressing a brake rotor from opposite sides with brake pads.

3. Configuration of Short Circuit

As shown in FIG. 2, the control ECU 20 controls the inverter 22 and the short circuit 24. The control ECU 20 controls a rotation direction and a rotation speed of the motor 46 through the inverter 22. Also, the control ECU 20 short-circuits the motor 46 through the short circuit 24.

FIG. 3 is a diagram showing an example of a configuration of the short circuit 24.

As shown in FIG. 3, the short circuit 24 includes a switch 60a, a switch 60b, and a switch 60c which turn on and off following an instruction from the control ECU 20, and a resistor 62a, a resistor 62b, and a resistor 62c.

FIG. 3 shows an example where the short circuit 24 includes three switches 60a, 60b, and 60c, but the short circuit 24 may include, for example, a circuit configuration only including two switches 60a and 60b to short-circuit three phases of the motor 46 by the switches 60a and 60b. Alternatively, the short circuit 24 may include a circuit configuration from which the mounted resistors 62a to 62c are omitted depending on properties of the motor 46.

The motor 46 is, for example, a three-phase AC brushless motor, and includes three motor coils 50u, 50v, and 50w as shown in FIG. 3.

The motor 46 rotationally drives the screw shaft 42 with the power supplied from the battery 16 through the inverter 22.

Furthermore, the motor 46 generates regenerative power based on an external force inputted from the wheel TR side into the screw shaft 42, and outputs the generated power to the battery 16.

The switch 60a short-circuits a power line 64u and a power line 64v corresponding to the motor coil 50u and the motor coil 50v, respectively, following the instruction from the short circuit instruction unit 212. The resistor 62a adjusts current flowing through the motor coil 50u and the motor coil 50v, in a case where the switch 60a short-circuits the power lines 64u and 64v.

The switch 60b short-circuits the power line 64v and a power line 64w corresponding to the motor coil 50v and the motor coil 50w, respectively, following the instruction from the short circuit instruction unit 212. The resistor 62b adjusts current flowing through the motor coils 50v and 50w, in a case where the switch 60b short-circuits the power lines 64v and 64w.

The switch 60c short-circuits the power line 64u and the power line 64w corresponding to the motor coil 50u and the motor coil 50w, respectively, following the instruction from the short circuit instruction unit 212. The resistor 62c adjusts current flowing through the motor coils 50u and 50w, in a case where the switch 60c short-circuits the power lines 64u and 64w.

4. Processing of Control ECU According to First Method

FIG. 4 is a flowchart showing an example of processing of the electric suspension control ECU 20 according to the first method. In the first method, the speed instruction unit 213 lowers the predetermined speed VM, as the number NE of the electric actuators 12 which become abnormal increases.

As shown in FIG. 4, first, the abnormality detection unit 211 determines in step S101 whether an abnormality occurs in the electric suspension apparatus 10.

In a case where the abnormality detection unit 211 determines that the abnormality does not occur in the electric suspension apparatus 10 (NO in step S101), processing is in a standby state. In a case where the abnormality detection unit 211 determines that the abnormality occurs in the electric suspension apparatus 10 (YES in step S101), the processing advances to step S103.

Then, in the step S103, the short circuit instruction unit 212 short-circuits the motor 46 of each of the first electric actuator 12A to the fourth electric actuator 12D.

Next, the speed instruction unit 213 determines in step S105 whether the number NE is four. The number NE is the number of the electric actuators 12 determined to be abnormal by the abnormality detection unit 211, in the first electric actuator 12A to the fourth electric actuator 12D.

In a case where the speed instruction unit 213 determines that the number NE is not four (NO in step S105), the processing advances to step S107.

Then, in the step S107, the speed instruction unit 213 determines whether the number NE is three.

In a case where the speed instruction unit 213 determines that the number NE is not three (NO in step S107), the processing advances to step S109.

Then, in the step S109, the speed instruction unit 213 sets the predetermined speed VM to 90 km/hour. Afterward, the processing advances to step S115.

In a case where the speed instruction unit 213 determines that the number NE is three (YES in step S107), the processing advances to step S111.

Then, in the step S111, the speed instruction unit 213 sets the predetermined speed VM to 70 km/hour. Afterward, the processing advances to the step S115.

In a case where the speed instruction unit 213 determines that the number NE is four (YES in step S105), the processing advances to step S113.

Then, in the step S113, the speed instruction unit 213 sets the predetermined speed VM to 50 km/hour. Afterward, the processing advances to the step S115.

Next, in the step S115, the speed instruction unit 213 instructs the speed control ECU 50 to limit the vehicle speed V to the predetermined speed VM or less. Afterward, the processing ends.

As described with reference to FIG. 4, the speed instruction unit 213 lowers the predetermined speed VM, as the number NE of the electric actuators 12 which become abnormal increases. Therefore, the predetermined speed VM can be set to an appropriate value.

5. Processing of Control ECU According to Second Method

FIG. 5 is a flowchart showing an example of processing of the electric suspension control ECU 20 according to the second method. In the second method, the speed instruction unit 213 lowers the predetermined speed VM in a case where the electric actuator 12 provided for the rear wheel becomes abnormal, as compared with a case where the electric actuator 12 provided for the front wheel becomes abnormal. Examples of the electric actuator 12 provided for the rear wheel include the third electric actuator 12C and the fourth electric actuator 12D shown in FIG. 1. Examples of the electric actuator 12 provided for the front wheel include the first electric actuator 12A and the second electric actuator 12B shown in FIG. 1.

As shown in FIG. 5, first, the abnormality detection unit 211 determines in step S201 whether the abnormality occurs in the electric suspension apparatus 10.

In a case where the abnormality detection unit 211 determines that the abnormality does not occur in the electric suspension apparatus 10 (NO in step S201), processing is in a standby state. In a case where the abnormality detection unit 211 determines that the abnormality occurs in the electric suspension apparatus 10 (YES in step S201), the processing advances to step S203.

Then, in the step S203, the short circuit instruction unit 212 short-circuits the motor 46 of each of the first electric actuator 12A to the fourth electric actuator 12D.

Next, the speed instruction unit 213 determines in step S205 whether the abnormality detection unit 211 determines that two electric actuators 12 provided for the rear wheels, i.e., the third electric actuator 12C and the fourth electric actuator 12D are abnormal.

In a case where the speed instruction unit 213 determines that the abnormality detection unit 211 does not determine that the two electric actuators 12 provided for the rear wheels are abnormal (NO in step S205), the processing advances to step S207.

Then, the speed instruction unit 213 determines in the step S207 whether the abnormality detection unit 211 determines that two electric actuators 12 provided for the front wheels, i.e., the first electric actuator 12A and the second electric actuator 12B are abnormal.

In a case where the speed instruction unit 213 determines that the abnormality detection unit 211 does not determine that the two electric actuators 12 provided for the front wheels are abnormal (NO in step S207), the processing advances to step S209.

Then, in the step S209, the speed instruction unit 213 sets the predetermined speed VM to 90 km/hour. Afterward, the processing advances to step S215.

In a case where the speed instruction unit 213 determines that the abnormality detection unit 211 determines that the two electric actuators 12 provided for the front wheels are abnormal (YES in step S207), the processing advances to step S211.

Then, in the step S211, the speed instruction unit 213 sets the predetermined speed VM to 80 km/hour. Afterward, the processing advances to the step S215.

In a case where the speed instruction unit 213 determines that the abnormality detection unit 211 determines that the two electric actuators 12 provided for the rear wheels are abnormal (YES in step S205), the processing advances to step S213.

Then, in the step S213, the speed instruction unit 213 sets the predetermined speed VM to 60 km/hour. Afterward, the processing advances to the step S215.

Next, in the step S215, the speed instruction unit 213 instructs the speed control ECU 50 to limit the vehicle speed V to the predetermined speed VM or less. Afterward, the processing ends.

As described with reference to FIG. 5, the speed instruction unit 213 lowers the predetermined speed VM in a case where the electric actuator 12 provided for the rear wheel becomes abnormal, as compared with a case where the electric actuator 12 provided for the front wheel becomes abnormal. Therefore, the predetermined speed VM can be set to the appropriate value.

6. Configurations and Effects

As described above, an electric suspension control ECU 20 according to the present embodiment, in a vehicle 1 including an electric suspension apparatus 10 driven with a motor 46, short-circuits the motor 46 and limits a vehicle speed V to a predetermined speed VM or less, in a case where an abnormality occurs in the electric suspension apparatus 10.

According to this configuration, the motor 46 is short-circuited, to generate regenerative power in the motor 46, so that the motor 46 can be provided with a braking force. Therefore, an operation of an electric actuator 12 included in the electric suspension apparatus 10 (in the present embodiment, a first electric actuator 12A to a fourth electric actuator 12D) can be regulated. Also, the vehicle speed V is limited to the predetermined speed VM or less, so that a behavior of the vehicle 1 can be stabilized.

Also, the electric suspension apparatus 10 includes an electric actuator 12 provided for each of a plurality of wheels TRs, and the electric suspension control ECU 20 lowers the predetermined speed VM, as the number NE of electric actuators 12 which become abnormal increases.

According to this configuration, as the number NE of the electric actuators 12 which become abnormal increases, the predetermined speed VM is lowered. Therefore, the behavior of the vehicle 1 can be stabilized.

Further, the electric suspension apparatus 10 includes an electric actuator 12 provided for each of a plurality of wheels TRs, and the electric suspension control ECU 20 lowers the predetermined speed VM, in a case where the electric actuator 12 provided for a rear wheel becomes abnormal, as compared with a case where the electric actuator 12 provided for a front wheel becomes abnormal.

According to this configuration, the predetermined speed VM is lowered, in the case where the electric actuator 12 provided for the rear wheel becomes abnormal, as compared with the case where the electric actuator 12 provided for the front wheel becomes abnormal. Therefore, the behavior of the vehicle 1 can be stabilized.

Additionally, the predetermined speed VM is equal to or more than 1 km/hour.

According to this configuration, even in the case where the abnormality occurs in the electric suspension apparatus 10, the vehicle 1 can evacuate to a safe place.

7. Another Embodiment

Note that the present invention is not limited to the above configuration of the embodiment, and the invention can be implemented in various aspects without departing from the scope of the invention.

For example, the above embodiment describes, but is not limited to the case where the electric suspension apparatus 10 includes the first electric actuator 12A to the fourth electric actuator 12D. For example, the electric suspension apparatus 10 may include the third electric actuator 12C and the fourth electric actuator 12D, and the apparatus does not have to include the first electric actuator 12A and the second electric actuator 12B. Conversely, the electric suspension apparatus 10 may include the first electric actuator 12A and the second electric actuator 12B, and the apparatus does not have to include the third electric actuator 12C and the fourth electric actuator 12D.

For example, the above embodiment describes but is not limited to the case where the electric suspension control ECU 20 short-circuits the motor 46 through the short circuit 24. The electric suspension control ECU 20 may short-circuit the motor 46 through the inverter 22. Specifically, the electric suspension control ECU 20 may short-circuit the motor 46, for example, by fixing the inverter 22 in an on state.

Also, the above embodiment describes, with reference to FIG. 4, but is not limited to the case where the electric suspension control ECU 20 lowers the predetermined speed VM, as the number NE of the electric actuators 12 which become abnormal increases. The predetermined speed VM may be set based on a position at which the electric actuator 12 becomes abnormal, and the number NE. In this case, the predetermined speed VM can be set further appropriately.

Further, the above embodiment describes, with reference to FIG. 5, but is not limited to the case where the electric suspension control ECU 20 lowers the predetermined speed VM, in the case where two electric actuators 12 provided for rear wheels become abnormal, as compared with the case where two electric actuators 12 provided for front wheels become abnormal. For example, the predetermined speed VM may be lowered, in a case where one electric actuator 12 provided for the rear wheel becomes abnormal, as compared with a case where one electric actuator 12 provided for the front wheel becomes abnormal.

At least part of the respective functional blocks shown in FIG. 2 may be achieved in hardware, or in hardware and software, and is not limited to a configuration to arrange independent hardware resources as shown in the drawing.

The control program executed by the processor 21B of the electric suspension control ECU 20 of the electric suspension apparatus 10 is stored in the memory 21A, but the control program may be stored in an external HDD or the like.

The processing units of the flowchart shown in each of FIGS. 4 and 5 are divided depending on main processing content, to facilitate understanding of the processing of the electric suspension control ECU 20. The embodiment is not limited by a dividing method or name of the processing unit shown in the flowchart of each of FIGS. 4 and 5. The processing of the electric suspension control ECU 20 may be divided into much more processing units depending on processing content, and one processing unit may be divided to include further processing. The above processing order in the flowchart is not limited to the shown example.

A control method of the electric suspension control ECU 20 can be achieved by allowing the processor 21B of the electric suspension control ECU 20 to execute a control program corresponding to the control method of the electric suspension control ECU 20. The control program can be recorded in advance in a computer readable recording medium. As the recording medium, a magnetic or optical recording medium or a semiconductor memory device may be used. Specifically, examples of the recording medium include a portable recording medium such as a flexible disk, a compact disk read only memory (CD-ROM), a digital versatile disc (DVD), Blue-ray (registered trademark) disc, a magneto-optic disk, a flash memory, or a card recording medium, and a fixed recording medium. The recording medium may be a nonvolatile storage device such as RAM, ROM, HDD, or another internal storage device included in the electric suspension apparatus 10. The control method of the electric suspension control ECU 20 may be achieved by storing the control program corresponding to the control method of the electric suspension control ECU 20 in a server device or the like, and by downloading the control program from the server device to the electric suspension control ECU 20.

8. Configurations Supported by the Above Embodiment

The above embodiment supports the following configurations.

(Configuration 1)

A vehicle control device which, in a vehicle including an electric suspension apparatus driven with a motor, short-circuits the motor and limits a vehicle speed to a predetermined speed or less, in a case where an abnormality occurs in the electric suspension apparatus.

According to the vehicle control device of configuration 1, the motor is short-circuited, to generate regenerative power in the motor, so that the motor can be provided with a braking force. Therefore, an operation of an electric actuator included in the electric suspension apparatus can be regulated. Also, the vehicle speed is limited to the predetermined speed or less, so that a behavior of the vehicle can be stabilized.

(Configuration 2)

The vehicle control device according to configuration 1, wherein the electric suspension apparatus includes an electric actuator provided for each of a plurality of wheels, the vehicle control device lowering the predetermined speed, as the number of electric actuators which become abnormal increases.

According to the vehicle control device of configuration 2, as the number of the electric actuators which become abnormal increases, the predetermined speed is lowered. Therefore, the behavior of the vehicle can be stabilized.

(Configuration 3)

The vehicle control device according to configuration 1 or 2, wherein the electric suspension apparatus includes an electric actuator provided for each of a plurality of wheels, the vehicle control device lowering the predetermined speed, in a case where the electric actuator provided for a rear wheel becomes abnormal, as compared with a case where the electric actuator provided for a front wheel becomes abnormal.

According to the vehicle control device of configuration 3, the predetermined speed is lowered, in the case where the electric actuator provided for the rear wheel becomes abnormal, as compared with the case where the electric actuator provided for the front wheel becomes abnormal. Therefore, the behavior of the vehicle can be stabilized.

(Configuration 4)

The vehicle control device according to any one of configurations 1 to 3, wherein the predetermined speed is equal to or more than 1 km/hour.

According to the vehicle control device of configuration 4, even in the case where the abnormality occurs in the electric suspension apparatus 10, the vehicle can evacuate to a safe place.

REFERENCE SIGNS LIST

1 . . . vehicle, 10 . . . electric suspension apparatus, 12 . . . electric actuator, 12A . . . first electric actuator, 12B . . . second electric actuator, 12C . . . third electric actuator, 12D . . . fourth electric actuator, 13 . . . power line, 14 . . . signal line, 20 . . . electric suspension control ECU (vehicle control device), 21A . . . memory, 21B . . . processor, 211 . . . abnormality detection unit, 212 . . . short circuit instruction unit, 213 . . . speed instruction unit, 22 . . . inverter, 24 . . . short circuit, 30 . . . coupling part, 32 . . . inner tube, 34 . . . nut, 40 . . . outer tube, 42 . . . screw shaft, 44 . . . bearing, 46 . . . motor, 50 . . . speed control ECU, BD . . . vehicle body, NE . . . number, S1 . . . acceleration sensor, S2 . . . stroke sensor, S3 . . . rotation angle sensor, ST . . . stroke, TR . . . wheel, V . . . vehicle speed, VM . . . predetermined voltage, α . . . acceleration, θ . . . rotation angle

What is claimed is:

1. A vehicle control device which controls a vehicle comprising an electric suspension apparatus driven with a motor, and comprises a processor that short-circuits the motor and limits a vehicle speed to a predetermined speed or less, in a case where an abnormality occurs in the electric suspension apparatus, wherein
the electric suspension apparatus comprises an electric actuator provided for each of a plurality of wheels,
the processor lowers the predetermined speed, as the number of electric actuators which become abnormal increases.

2. A vehicle control device which controls a vehicle comprising an electric suspension apparatus driven with a motor, and comprises a processor that short-circuits the motor and limits a vehicle speed to a predetermined speed or less, in a case where an abnormality occurs in the electric suspension apparatus, wherein
the electric suspension apparatus comprises an electric actuator provided for each of a plurality of wheels,
the processor lowers the predetermined speed, in a case where the electric actuator provided for a rear wheel becomes abnormal, as compared with a case where the electric actuator provided for a front wheel becomes abnormal.

3. The vehicle control device according to claim 1, wherein the predetermined speed is equal to or more than 1 km/hour.

4. The vehicle control device according to claim 2, wherein the predetermined speed is equal to or more than 1 km/hour.

* * * * *